United States Patent
Deng et al.

(10) Patent No.: US 11,625,646 B2
(45) Date of Patent: Apr. 11, 2023

(54) METHOD, SYSTEM, AND MEDIUM FOR IDENTIFYING HUMAN BEHAVIOR IN A DIGITAL VIDEO USING CONVOLUTIONAL NEURAL NETWORKS

(71) Applicant: HUAWEI CLOUD COMPUTING TECHNOLOGIES CO., LTD.

(72) Inventors: Huawu Deng, Gatineau (CA); Mohammad Hamed Mousazadeh, Oakville (CA); Walid Mohamed Aly Ahmed, Mississauga (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 379 days.

(21) Appl. No.: 16/841,227

(22) Filed: Apr. 6, 2020

(65) Prior Publication Data
US 2021/0312321 A1    Oct. 7, 2021

(51) Int. Cl.
*G06N 20/00*  (2019.01)
*G06F 17/16*  (2006.01)
*G06K 9/62*  (2022.01)
*G06V 40/20*  (2022.01)
*G06V 40/10*  (2022.01)
*G06V 10/10*  (2022.01)

(52) U.S. Cl.
CPC ............ *G06N 20/00* (2019.01); *G06F 17/16* (2013.01); *G06K 9/6267* (2013.01); *G06V 40/10* (2022.01); *G06V 40/20* (2022.01); *G06V 10/10* (2022.01)

(58) Field of Classification Search
CPC ....................................... G06N 20/00
USPC ................................................ 706/12
See application file for complete search history.

(56) References Cited

U.S. PATENT DOCUMENTS

| | | | |
|---|---|---|---|
| 7,330,566 B2 | 2/2008 | Cuttler | |
| 8,792,722 B2 | 7/2014 | Liu et al. | |
| 8,928,816 B2 | 1/2015 | Fahn et al. | |
| 9,278,255 B2 | 3/2016 | Cheng et al. | |
| 11,161,456 B1* | 11/2021 | Day | B60R 1/00 |
| 2019/0279048 A1 | 9/2019 | Balslev et al. | |
| 2020/0020118 A1* | 1/2020 | Chapdelaine-Couture | G06T 7/37 |
| 2021/0019507 A1* | 1/2021 | Brookshire | G06V 40/25 |

FOREIGN PATENT DOCUMENTS

| | | |
|---|---|---|
| CN | 109344692 A | 2/2019 |
| CN | 109697416 A | 4/2019 |
| CN | 110231605 A | 9/2019 |
| CN | 110688969 A | 1/2020 |

* cited by examiner

*Primary Examiner* — Ruay Ho

(57) ABSTRACT

A method, processing system and processor-readable medium for classifying human behavior based on a sequence of frames of a digital video. A 2D convolutional neural network is used to identify key points on a human body, such as human body joints, visible within each frame. An encoded representation of the key points is created for each video frame. The sequence of encoded representations corresponding to the sequence of frames is processed by a 3D CNN trained to identify human behaviors based on key point positions varying over time.

15 Claims, 8 Drawing Sheets

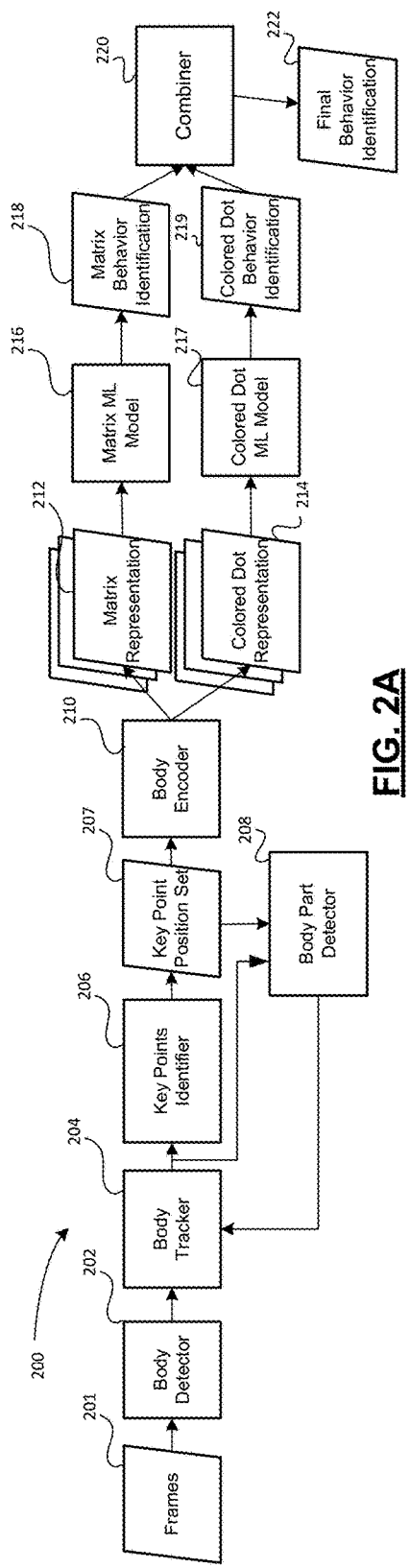
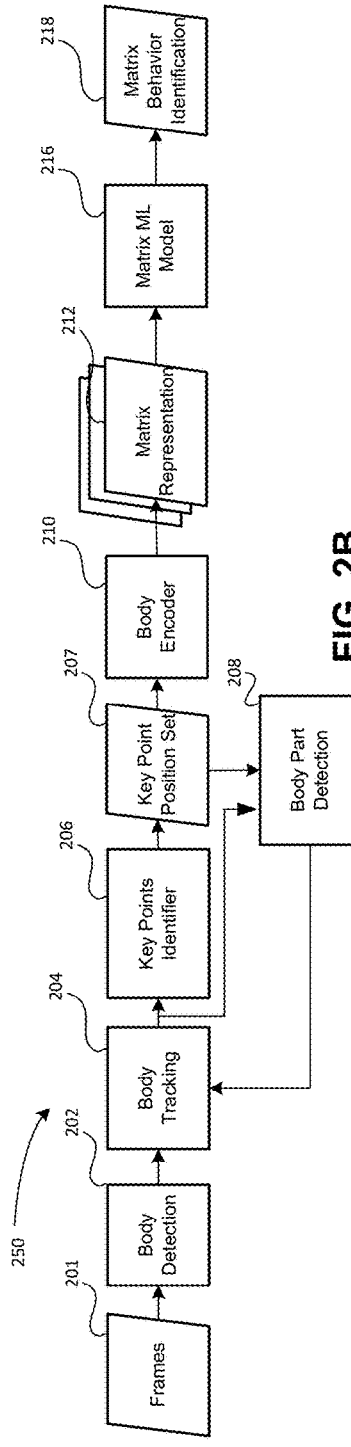
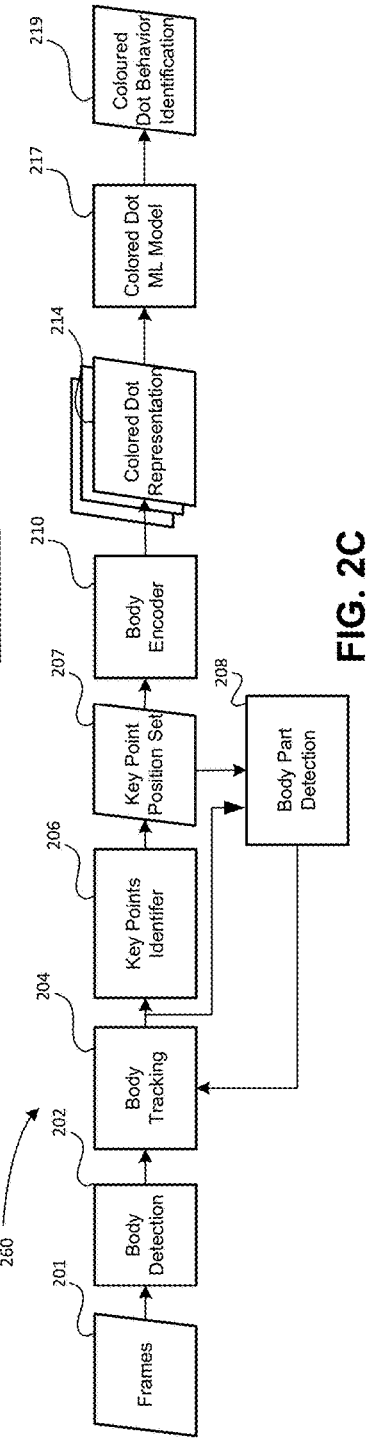

METHOD, SYSTEM, AND MEDIUM FOR IDENTIFYING HUMAN BEHAVIOR IN A DIGITAL VIDEO USING CONVOLUTIONAL NEURAL NETWORKS

TECHNICAL FIELD

The present disclosure relates to human body tracking in a digital video, and in particular to a method, system, and processor readable medium for identifying a behavior of the human body in a digital video.

BACKGROUND

Recognizing human behavior is a longstanding problem in computer vision research. While machine learning has resulted in advances in the realm of computer vision, including a range of approaches to identifying humans in digital images or digital videos, and for tracking the movement of human bodies over multiple frames of a digital video the recognition or identification of specific types of human behavior in a digital video remains a difficult.

Within computer vision, machine learning has been applied to the problem of human behavior identification with limited success. Current machine learning approaches show accuracy well below human-level performance in recognizing and identifying human behaviors from digital videos. For example, a system developed by Facebook to identify prohibited forms of video content based on the human behaviors shown in a digital video made news headlines in early 2019 due to its failure to detect the violent actions of a mass shooter in New Zealand in a video uploaded to the platform (see https://www.nbcnews.com/tech/tech-news/facebook-says-its-artificial-intelligence-systems-failed-detect-new-zealand-n985731).

Various machine learning approaches for identifying human behavior in a digital video using machine learning appear in the literature. Some of these machine learning approaches use convolutional neural networks, which are well suited to processing two-dimensional and three-dimensional digital images efficiently. Some of the machine learning approaches use recurrent neural networks, which are well suited to processing data that changes over time, but which are typically very computationally intensive. Several such machine learning approaches are shown in FIG. 1A-1D:

In FIG. 1A, a first machine learning approach 10 for identifying and classifying human behavior in digital videos is shown. The first machine learning approach uses a two-dimensional convolutional neural network (2D CNN) 14 to perform spatial processing of a sequence of two-dimensional frames 12 of a digital video and generate spatial information. In parallel with the 2D CNN 14, the first machine learning approach 10 uses an optical flow module 16 to process the sequence of two-dimensional frames 12 of the digital video to derive optical flow data from the sequence of frames 12. The optical flow data 16 output by the optical flow module 16 and the spatial information output by the 2D CNN 14 are combined to build a pattern of apparent motion of a human detected in the sequence of sequence of two-dimensional frames 12. Combining the optical flow data output by the optical flow module 16 and the spatial information output by the 2D CNN 14 yields background and human information 18 representative of the pattern of apparent motion of the human detected in the sequence of two-dimensional frames 12. The background and human information 18 is provided to a human behavior classifier 19 to identify one category (or class) corresponding to the behavior of the human detected in the sequence of two-dimensional frames 12.

In FIG. 1B, a second machine learning approach 20 also uses a two-dimensional convolutional neural network (2D CNN) 24 to process a sequence of two-dimensional frames of the digital video 12 to generate spatial information. In parallel with the processing performed by the 2D CNN 24, a recurrent neural network (RNN) 26 is used to process the sequence of two-dimensional frames 12 of the digital video to derive temporal data from the sequence of two-dimensional frames 12 in the digital video. The temporal data output by the RNN 26 and the spatial data output by the 2D CNN 24 are combined, yielding human temporal and spatial information 28 indicative of human body detected in the sequence of two-dimensional frames and movement of the human body over time in the sequence of two-dimensional frames 12. The human temporal and spatial information 28 is provided to a human behavior classifier 29 which identifies the behavior of the human detected in the sequence of two-dimensional frames 12 based on the human temporal and spatial information 28.

In FIG. 1C, a third machine learning approach 30 also uses a three-dimensional convolutional neural network (3D CNN) 34 having a number of layers to process the temporal sequence of two-dimensional frames 12 of the digital video, with the third dimension of the neural network being time. The 3D CNN 34 generates background information and human temporal and spatial information 38 indicative of the background and the movement of a human body detected and tracked in the temporal sequence of two-dimensional frames 12. The background information and human temporal and spatial information 38 is provided to a human behavior classifier 39 to identify the behavior of the human body detected and tracked in the temporal sequence of two-dimensional frames 12 based on the background information and human temporal and spatial information.

In FIG. 1D, a fourth machine learning approach 40 uses a two-dimensional convolutional neural network (2D CNN) 44 to process the individual two-dimensional frames of the sequence of two-dimensional frames 12 to identify key points on the human body shown in the sequence of frames 12. Once key points are identified in each frame by the 2D CNN, the key points of each frame are provided to a rule based logic block 48 which is used to identify poses of the human body based on the key points received from the 2D CNN 44. A human behavior classifier 49 that includes a three-dimensional convolutional neural network (3D CNN) receives the detected poses from the rule based logic block 49 and identifies the behavior of the human(s) in the sequence of frames 12 based on the sequence of poses detected by the rules based logic 48.

Specific references disclosing related approaches include U.S. Pat. No. 7,330,566B2, issued to Microsoft Technology Licensing LLC, entitled "Video-based gait recognition", which discloses a rules-based logic for identifying human behavior (without the use of key points); U.S. Pat. No. 8,792,722B2, issued to Sony Corp, entitled "Hand gesture detection", which applies support-vector-machine-based machine learning to identifying human hand gestures; U.S. Pat. No. 8,928,816B2, issued to the National Taiwan University of Science and Technology, entitled "Activity recognition method", which uses rules-based logic similar to the fourth approach 40 above to identify poses before using support-vector-machine-based machine learning to identify specific behaviors; and U.S. Pat. No. 9,278,255B2, issued to Carnegie Mellon University/Arris Enterprises LLC, entitled "System and method for activity recognition", which uses approaches similar to both the third approach 30 and fourth approach 40 described above, but without the use of key points.

Each of the machine learning approaches described above exhibit shortcomings in accuracy in identifying the behavior of a human detected in the sequence of frames 12 of a digital video and/or computational efficiency in processing a sequence of frames 12 of the digital video to identify the behavior of a human. The lack of accuracy and/or computational efficiency of the machine learning approaches shown in FIGS. 1A-1D inhibit the use of these approaches in application in applications requiring real-time execution. Examples of such applications include real-time video surveillance for human safety in places with possible high risks such as airports, train stations, and construction sites, or monitoring the health conditions of patients at hospitals.

SUMMARY

The present disclosure provides a method, processing system and processor readable medium for identifying human behavior in a sequence of frames of a digital video. In some embodiments, the method, processing system, and processor-readable medium use a two-dimensional convolutional neural network that receives the sequence of frames of a digital video and identifies key points within each frame of the sequence of frames of the digital video. The processing system, and processor-readable medium encodes the identified key points for each frame. A second convolutional neural network, including a third temporal dimension, is used to process the data structures corresponding to the temporal sequence of frames to identify human behavior in the sequence of frames of the digital video.

Example embodiments are directed to a method for identifying human behavior in a sequence of frames of a digital video. The method includes receiving at least one key point position set for a frame of a sequence of frame, the at least one key point position set including a key point position for each key point of a human body detected in the frame, each key point position corresponding to a location of the key point on the human body. The method further includes generating an encoded representation for each of the at least one key point position set for the frame, and providing the encoded representation for each of the at least one key point position set for the frame to a human behaviour classifier that includes a machine learned model that is configured to identify a behaviour of the human body based on the encoded representation for each key point position set and output the identified behavior of the human body.

Other example embodiments are directed to a processing system for identifying human behavior in a sequence of frames of a digital video. The processing system comprises a processor and a memory. The memory has stored thereon executable instructions. When executed by the processor, the executable instructions cause the device to carry out the method described above.

In some such embodiments, the method or processing system may exhibit various advantages over known techniques for identifying human behavior in a sequence of frames of a digital video. The use of two machine-learned models may allow the problem of behavior classification to be broken down into a simplified representation of human body movement in a computationally-efficient way before applying a second computationally-efficient model to classify the behavior. More particularly, the key point identification step may extract spatial data from each video frame, after which the behavior classification step may be used to predict behavior based on the spatial-temporal data represented by the (temporal) sequence of encoded representations of frame spatial data.

Furthermore, by using a machine learned model to identify the behavior based on encoded representations of key point position sets, the method and processing system may exhibit greater flexibility and less programming logic than a rules-based system for classifying behaviors based on key point data.

According to a further aspect which can be combined with other aspects disclosed herein, the method further comprises receiving a plurality of key point position sets, each key point position set correspond to one frame in the sequence of frames; and generating an encoded representation for each key point position set of the plurality of key point position sets; and providing the encoded representation to the human behaviour classifier that includes the machine learned model that is configured to identity a human behaviour based on the plurality of encoded representations and output the identified behavior of the human body.

According to a further aspect which can be combined with other aspects disclosed herein, the method further comprises receiving the sequence of frames; and processing each respective frame in the sequence of frames to generate the key point position set corresponding to the respective frame.

According to a further aspect which can be combined with other aspects disclosed herein, the key point position set is generated using a key points identifier. The key points identified is configured to receive a bounding box for the human body comprising one or more pixel values of a plurality of pixels of the respective frame, process the bounding box to identify key points within the bounding box and generate a key point position for each key point, and generate the key point position set that includes the key point position for each key point identified in the frame. Using a key points identifier that includes a CNN to identify key points in a single frame may result in greater computational efficiency than other approaches, such as using an RNN or processing a time series of frames using a 3D CNN.

According to a further aspect which can be combined with other embodiments disclosed herein, the encoded representation is a matrix representation and wherein the machine-learned model is a matrix machine-learned model.

According to a further aspect which can be combined with other embodiments disclosed herein, each key point position corresponds to a joint of the human body. The identification of joints of a human body as key points in a frame allows for efficient and accurate identification of behaviour of a human body by tracking the location and movement of the joints.

According to a further aspect which can be combined with other aspects disclosed herein, each encoded representation comprises an X matrix and a Y matrix. The X matrix has a plurality of X pixel coordinates for the plurality of key point positions in the key point position set, a first X pixel coordinate and second X pixel coordinate being positioned within the matrix relative to each other based on a proximity relationship or movement relationship between a first joint of the human body and a second joint of the human body corresponding to the first X pixel coordinate and second X pixel coordinate respectively. The Y matrix has a plurality of Y pixel coordinates for the plurality of key point positions in the key point position set, a first Y pixel coordinate and second Y pixel coordinate being positioned within the matrix relative to each other based on a proximity relationship or movement relationship between a first joint of the human body and a second joint of the human body corresponding to the first Y pixel and second Y pixel coordinate respectively. By using matrices with each key point pixel coordinate positioned within each matrix proximal to other key points having a proximal or related relationship on the human body, the significance of particular movements of two joints in relation to each other that tend to define particular behaviors can be identified and computed more effectively by a machine learned model.

According to a further aspect which can be combined with other embodiments disclosed herein, each encoded representation further comprises a Z matrix having a plurality of Z depth coordinates for the plurality of key point positions in the key point position set, a first Z depth coordinates and second Z value being positioned within the matrix relative to each other based on a proximity relationship or movement relationship between a first joint of the human body and a second joint of the human body corresponding to the first Z value and second Z value respectively. By using a third depth dimension, the matrix encoding of key point positions in each frame may provide increased spatial resolution information to the machine learned model.

According to a further aspect which can be combined with other aspects disclosed herein, wherein the encoded representation is a colored-dot representation and wherein the machine learned model is a colored-dot machine learned model.

According to a further aspect which can be combined with other aspects disclosed herein, each encoded representation comprises a simplified frame comprising a plurality of unique key point visual representations positioned within the simplified frame based on the key point position set. By encoding the key point coordinates in a simplified visual representation, the colored-dot machine learned model may be able identify the behavior of the human body without needing to perform the difficult task of body tracking.

According to a further aspect which can be combined with other aspects disclosed herein, each unique key point visual representation comprises a two-dimensional shape having a unique color relative to each other unique key point visual representation, and the simplified video frame comprises the plurality of key point visual representations superimposed on a monochromatic background. The simplified frame comprises the plurality of key point visual representations superimposed on a monochromatic background. By using uniquely-colored shapes to represent each key point in a frame, the colored-dot machine learned model focuses on extracting temporal patterns of movement to identify behaviors.

According to a further aspect which can be combined with other aspects disclosed herein, the method includes generating a second encoded representation for each of the at least one key point position set for the frame; and providing the second encoded representation for each of the at least one key point position set for the frame to a colored-dot machine learned model of the human behaviour classifier. The colored-dot machine learned model configured to identify a second behaviour of the human body based on the second encoded representation for at least one key point position set and output the second identified behavior of the human body; and a combiner configured to generate a final behaviour of the human body by combining the identified behaviour of the human body output by the matrix machine learned model with the second identified behavior of the human body output by the colored-dot machine learned model.

According to a further aspect which can be combined with other embodiments disclosed herein, there is provided a non-transitory processor-readable medium containing instructions executable by a processor to carry out the method steps above.

BRIEF DESCRIPTION OF THE DRAWINGS

Embodiments will now be described by way of examples with reference to the accompanying drawings, in which like reference numerals may be used to indicate similar features.

FIG. 2A is a block diagram of a system for identifying human behavior in a sequence of frames of a digital video using both a matrix representation and a colored dot representation of key point coordinate sets according to a first example embodiments described herein.

FIG. 2B is a block diagram of a system for identifying human behavior in a sequence of frames of a digital video using only a matrix representation of key point coordinate sets according to a second example embodiments described herein.

FIG. 2C is a block diagram of a system for identifying human behavior in a sequence of frames of a digital video using only a colored dot representation of key point coordinate sets according to a third example embodiments described herein.

DESCRIPTION OF EXAMPLE EMBODIMENTS

Figure 1A:
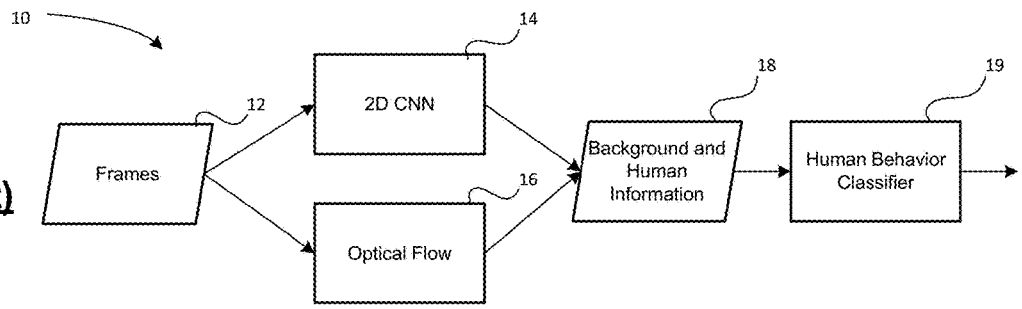
FIG. 1A is a block diagram of a first known system for identifying human behavior in frames of a digital video.
Figure 1B:
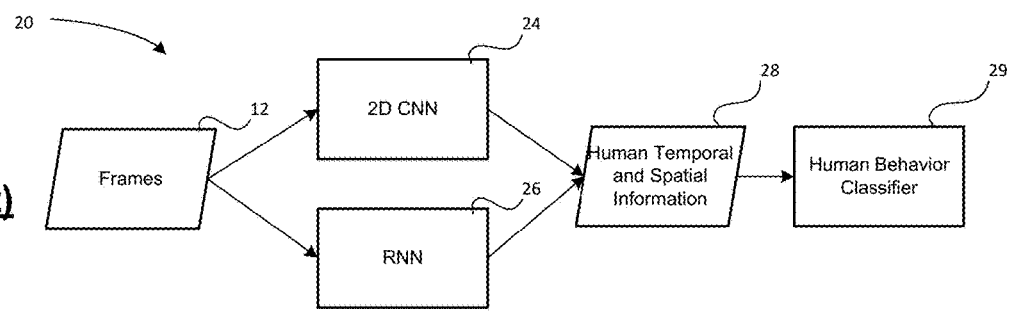
FIG. 1B is a block diagram of a second known system for identifying human behavior in a sequence of frames of a digital video.
Figure 1C:
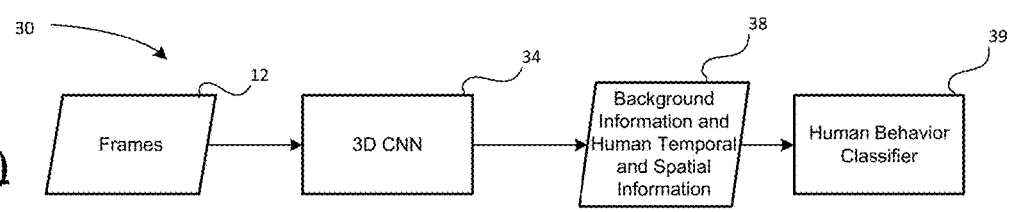
FIG. 1C is a block diagram of a third known system for identifying human behavior in a sequence of frames of a digital videos.
Figure 1D:
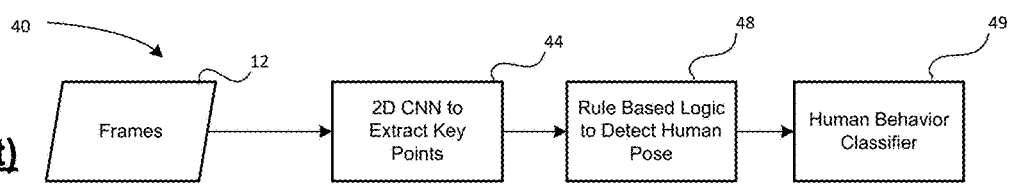
FIG. 1D is a flowchart of a known method for identifying human behavior in a sequence of frames of a digital video.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments will now be described with respect to methods, systems, and non-transitory media for identifying human behavior in a sequence of frames of a digital video. The methods, systems, and non-transitory media described herein receive a sequence of frames of a digital video and process the sequence of frames to detect and track a human in the sequence of frames and generate one or more encodings of human body position and movement. The methods, systems, and non-transitory media described herein performs a three-dimensional convolution on the one or more encodings of human body position and movement in order to efficiently identify a behavior of each human detected and tracked in the sequence of frames. An encoding of human body position and movement may be representative of superimposed key points represented in colors on a white background or a trajectory matrix.

In some embodiments, an encoding of human body position and movement relies on key points of the human body (hereinafter referred to as key points). The one of more encodings of human body position and movement may be provided to a 3D convolutional deep neural network which performs a three-dimensional convolution on the one or more encodings of human body position and movement in order to efficiently identify a behavior of each human detected and tracked in the sequence of frames. The 3D CNN captures spatiotemporal features in the encodings of human body position and movement that offer enough information to identify the behavior of the human body detected and tracked in the sequence of frames (e.g., to identify a class or category of human behavior from a set of classes or categories of human behavior). Two different human body position and movement encodings are described herein as two different encoded representations, which may be stored in data structures. Either of the two different encoded representations, or both of the two different encoded representations, can be used as input to the 3D CNN. The 3CNN can be used to generate an inferential identification of a human behavior for one or both of the two different encoded representations. The identified human behavior may be combined to improve the identification of the human behavior of a human detected and tracked in the sequence of frames.

The first encoded representation of the key point data is referred to herein as a matrix representation. The matrix representation may comprise either two or three two-dimensional matrices corresponding to either two or three dimensions in which the key points are tracked in each frame in the sequence of frames.

The second encoded representation is referred to herein as a colored dot representation. Each key point's position (e.g. an x-y or x-y-z pixel coordinate set) extracted from a frame of the sequence of frames is represented as a uniquely-colored dot (or other 2D shape) on a blank background in a location corresponding to the position of the key point in the frame.

Figure 1E:
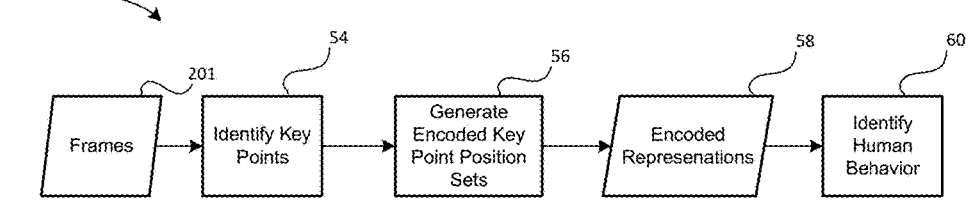
FIG. 1E is a block diagram illustrating a method for identifying human behavior in a sequence of frames of a digital video according to example embodiments described herein.

With reference to FIG. 1E, a simplified block diagram of a method 50 for identifying human behavior in sequence of frames 201 of a digital video is shown. The method 50 begins at block 54 where each frame of the sequence of frames 201 is processed to identify key points of a human body in the frame. In some embodiments, each frame (e.g. digital image) is a two-dimensional (2D) frame that includes a corresponding RGB (red, green, and blue) value for each pixel in the 2D frame. Each frame includes a corresponding RGB (red, green, and blue) value for each pixel in the frame and a depth (Z) value for each pixel in the frame. A camera having depth-finding capabilities may capture the frame and generate the depth (Z) value for each pixel in the frame. Alternatively, pre-processing of each frame of the sequence of fames may be performed to extract a depth value for each pixel corresponding to a human detected in the frame.

In some embodiments, each frame is processed at block 54 using a two-dimensional (2D) convolutional neural network (CNN) that has been trained to identify key points in frames (e.g. digital images) as described in further detail below. The trained 2D CNN performs feature extraction to identify a set of key points for a human body detected in each respective frame of a sequence of frames 201. The trained 2D CNN may be a trained body tracking or pose estimation CNN. An example of a trained pose estimation CNN is described by Alexander Toshev and Christian Szegedy in *DeepPose: Human Pose Estimation via Deep Neural Networks*, arXiv:1312.4659, https://arxiv.org/abs/1312.4659, which is hereby incorporated by reference as if reproduced in their entirety. Another example of a trained pose estimation CNN is described in Zhe Cao, Gines Hidalgo, Tomas Simon, Shih-En Wei, and Yaser Sheikh in *OpenPose: Realtime Multi-Person 2D Pose Estimation using Part Affinity Fields*, arXiv:1812.08008, https://arxiv.org/abs/1812.08008, which is also hereby incorporated by reference as if reproduced in their entirety.

Each key point corresponds to a position of a pixel in a respective frame. In some embodiments, each frame is a 2D digital image with pixel color values mapped to a 2D X-Y coordinate system wherein X is a horizontal pixel position beginning at 0 at the left edge of the image and increasing toward the right edge, and Y is a vertical pixel position beginning at 0 at the top edge of the image and increasing toward the bottom edge. Each key point includes a horizontal coordinate (X) and vertical coordinate (Y) for the position of the pixel in the frame that has been identified as a key point in the frame.

Embodiments using frames having a depth dimension use a 3D X-Y-Z coordinate system, wherein Z is a depth pixel position beginning at 0 at the position of the camera used to capture the frame and increasing away from the camera into the scene. In some embodiments using a depth dimension, pixels are represented as a 2D X-Y array of color values and depth (Z) values, yielding a single pixel for each X-Y coordinate.

In embodiments in which each respective frame includes a depth (Z) value for each pixel in the frame, a key point includes a horizontal coordinate (X), a vertical coordinate (Y), and a depth value (Z) for the pixel in the frame that has been identified as a key point in the frame. In some embodiments, the key point correspond to the positions in the frame of various joints or other locations on a human detected and tracked in the frame.

After a frame has been processed at block 54 to identify key points in each frame, the position of each key point identified in the frame (called a "key point position") are encoded at block 56 into an encoded representation. Example encoded representations 58 are described in greater detail below. Some encoded representations 106 may be generated by building trajectories of the key points in space (X, Y, and possibly Z). Other encoded representations 106 may be generated by eliminating redundant information, such as background imagery, and superimposing the key points over each other in a simplified visual representation, such as colored shapes on a monochromatic background. In some embodiments, the method 50 may make use of multiple different types of encoded representations 58, with human behavior classification performed on the different types of encoded representations 58 and the outputs of the different types of human behavior classification compared or combined to generate more robust human behavior classification.

The encoded representations 58 generated by block 56 are a plurality of encoded representations corresponding to the sequence of frames 101, e.g. a plurality of encoded representations corresponding to a temporal sequence of frames. The plurality of encoded representations 58 encodes spatial information (key point positions in a frame) and temporal information about a human detected and tracked in the sequence of frames 101. The plurality of encoded representations 58 are processed at block 60 to identify human behaviour of a human detected in the sequence of frames 101 based on the encoded representations. In some embodiments, the encoded representations 58 are processed using a three-dimensional convolutional neural network (3D CNN), with two dimensions corresponding to the key point positions within a given frame and the third dimension corresponding to the time index of given frame in the temporal sequence of frames 101. The plurality of encoded representations 58 are processed to identify human behavior of a human detected in the sequence of frames 101 as described in greater detail below. The trained 3D-CNN has been previously trained with large amount of training data.

In the embodiments described herein, a 2D CNN and 3D CNN are examples of trained neural networks that are used to identify key points in a sequence of frames 101 and to identify human behavior of human(s) based on plurality of encoded representations 58, respectively. As described above, the use of CNNs instead of recurrent neural networks or rules-based logic may present certain advantages in some applications.

In some other embodiments, the 2D CNN may be substituted with a module that includes a model that is constructed or built using a machine-learning algorithm, such as a supervised learning algorithm, unsupervised learning algorithm, or reinforcement learning algorithm, to identify key points in a sequence of frames 101. In some other embodiments, the 3D CNN may be substituted with another module that includes a model learned using machine learning algorithms, such as supervised learning, unsupervised learning, or reinforcement learning, which identifies human behavior of a detected and tracked human in a sequence of frames based on encoded representations 58.

With reference to FIGS. 2A-2C, three different embodiments of a system 200 that perform the method 50 are shown. FIG. 2A shows a hybrid system 200 for identifying human behavior in a sequence of frames 201 that uses two different types of encoded representations to identify two human behavior in a sequence of frames 201 and combines the identified human behaviors to generate a final human behavior. FIG. 2B shows a matrix system 250 for identifying human behavior in a sequence of frames 101 that uses matrix encoded representations to identify human behavior in a sequence of frames 101. FIG. 2C shows a colored dot system 260 that uses colored dot encoded representations to identify human behavior in a sequence of frames 101.

Referring to FIG. 2A, a hybrid system 200 for identifying human behavior in a sequence of frames 201 is shown. The hybrid system 200 includes a body detector 202, the body tracker 204, the key points identifier 206, the body part detector 208, the body encoder 210, and a human behaviour classifier 211. The human behaviour classifier 211 implements a matrix model learned using a machine learning algorithm (referred to hereinafter a matrix machine learned model 216), and implements a colored dot model learned using a machine learning algorithm (referred to hereinafter a color dot machine learned model 219) as described in further detail below.

In FIG. 2A, each respective frame of the sequence of frames 101 of a digital video is provided to a body detector 202. Each respective frame in the sequence of frames 101 corresponds to a different point in time. In some embodiments, each respective frame of the sequence of frames 101 is represented as a two-dimensional pixel array. Each pixel in the two-dimensional pixel array has a horizontal (X) and vertical (Y) pixel coordinate. Each pixel has one or more brightness or color values, such as three color values corresponding to red, green, and blue (RGB) color values. In some embodiments, each pixel also has a depth (Z) value, as noted above with reference to FIG. 1E.

The body detector 202 is configured to receive each respective frame of the sequence of frames and perform object detection on the respective frame to determine whether there is a human body, or part of a human body, in the respective frame.

When the body detector 202 detects a human body within the respective frame, the body detector 202 identifies a general location of where the human body is within the respective frame and generates a bounding box around the detected human body. An example bounding box output by the body detector 202 is bounding box 516 shown in FIG. 4A. The body tracker 204 receives the bounding box generated for the human body detected in the respective frame, assigns a unique identifier (ID) to the bounding box 204, and outputs the generated bounding box together with assigned unique ID. The unique ID is an identifier that uniquely identifies the human body detected in the respective frame. In some embodiments, the body detector 202 may detect multiple human bodies in the respective frame and generate a bounding box for each human body detected in the respective frame. In these embodiments, the body tracker 204 receives each bounding box generated by the body detector 202, assigns a unique ID for each bounding box, and outputs each respective bounding box together with the unique ID assigned to the respective bounding box.

The key points identifier 206 receives the bounding box for the human body detected in the respective frame. The key points identifier 206 processes the bounding box (e.g., processes the pixels of the respective frame located within the bounding box) to identify each key point of the human body detected in the respective frame, generates a position for each key point identified within the bounding box, and assigns a unique identifier to identified each key point. The position of each key point (referred to hereinafter as a key point position) includes the coordinates of the identified key point, including an X pixel coordinate, a Y pixel coordinate, and in some embodiments a Z coordinate. The key points identifier 206 also generates and outputs a key point position set 207 for the respective frame. The key point position set 207 for the respective frame includes the key point position for each respective key point identified in the bounding box for the human body detected in the respective frame and the unique identifier assigned to each key point.

In the embodiments described herein, each key point corresponds to a joint or other location on a human body, as described in greater detail below with respect to FIGS. 4A through 6B. An example the key point position set 207 for a respective frame output by the key points identifier 206 is shown in FIG. 4A, which illustrate the respective frame with key point positions 520, 522, 524 included in the key point position set for the respective frame. The frame shown in FIG. 4A also includes key point positions for other key points identified in the frame and included in the key point position set.

As described above, a key point position set 207 includes a key point position for each key point identified within the bounding box generated for the human body detected in the frame. Each key point position includes horizontal and vertical pixel coordinates (X,Y) or, in embodiments having a depth (Z) dimension, a horizontal, a vertical, and depth coordinates (X,Y,Z). The unique identifier assigned to each key point is referred to hereinafter as a key point identifier. The key point identifier may be an index number that corresponds to a particular key point. Key point identifiers that are index numbers are discussed in detail below with reference to FIG. 4B. The key point position and the key point identifier for each key point may be referred to as the "key point data".

The key point position set 207 for the respective frame is provided to a body encoder 210 and a body part detector 208. The body part detector 208 receives the bounding box together with the unique ID assigned to the bounding box output by the body tracker 204, and the key point position set output the key points identifier 206. The body part detector 208 uses the key point identifier assigned to each key point included in the key point position set 207 to detect the positions of body parts of the human body in the bounding box received from the body tracker 204 (e.g. the pixels of the frame located within the bounding box). An example of a body part identified by the body part detector 208 includes left upper arm 580 shown in FIG. 4B, which is defined by the segment extending from index number 5 corresponding to the left shoulder and index number 6 corresponding to the left elbow. The key point identifiers (e.g. index numbers 5 and 6) allow the body part detector 208 to infer information indicative of the position of body joints relative to each other, which allows identification of the position of the body parts defined or demarcated by those joints.

In some embodiments, the body part detector 208 provides information indicative of the position of body parts (e.g. body joints) relative to each other to the body tracker 204. The body tracker 204, the key points identifier 206, and the body part detector 208 form a feedback loop that provides information indicative of the position of body joints relative to each other output by the body part detector 208 to the body tracker 204 for use in processing of a subsequent frame in the sequence of frames 201. After the positions of body parts of the human body have been detected by the body part detector 208 in a first frame, information indicative of the position of body parts (e.g. body joints) relative to each other may be used to modify the bounding box for the human body generated by the body tracker 204 in a second frame of the sequence of frames 201. For example, if the body tracker 204 generates an ambiguous or uncertain inference of the location of the bounding box in the second frame when processing the second frame, information indicative of the position of body parts (e.g. body joint) relative to each other in the first frame may be used to disambiguate the ambiguous or uncertain inference of the location of the bounding box generated for the human body detected in the frame.

The body encoder 210 generates encoded representations of the key point position set 207 generated for each respective frame. Two distinct types of encoded representations are described herein. The first type is a matrix representation 212 of the key point position set corresponding to a frame of the sequence of frames 201, as further described below with reference to FIGS. 5A-5C. The second type is a colored dot representation 214 of the key point position set corresponding to a respective frame of the sequence of frames 201, as further described below with reference to FIGS. 6A-6B. Each different encoded representation type (e.g., matrix representation 212 or colour representation 214) may be referred to herein as a "encoded representation" or a "simplified encoded representation" of the key point position set.

Once an encoded representation (e.g. matrix representation 212 or colored dot representation 214) has been generated for a first frame of the sequence of frames 201, the encoded representation may be queued up until all subsequent frames of the sequence of frames 201 have been processed to generate the encoded representation for each subsequent frame. Alternatively, the encoded representation generated for the first frame in the sequence of frames 201 may be provided immediately to the human behaviour classifier 211 for processing. In some embodiments, a frame is received continuously as part of the sequence of frames 201 of a digital video, and a cache or queue is used to store a predetermined number of encoded representations for use as inputs to the human behavior classifier 211. The matrix representations 212 are provided to the human behavior classifier 211 and processed by a matrix machine learned model 216. The colored dot representations 214 are also provided to the human behaviour classifier and processed by a colored dot machine learned model 217. The processing of the matrix representations 212 by the matrix machine learned model 216 and colored dot representations 214 by the colored dot machine learned model 217 are described in further detail below. In general terms, the matrix machine learned model 216 uses learned knowledge of how the key point positions move over time, and learned relationships between and among the various key points (e.g. that the distance between a left elbow key point and a left hip key point is different for a walking behavior as opposed to a sitting behavior). And in general terms, the colored dot machine learned model 217 uses learned relationships between various different types of behaviors (e.g. walking, running, falling, sitting, riding a bike) and the movements of colored dots over time between simplified visual representations of each frame.

The matrix machine learned model 216 generates matrix behavior identification data 218 based on the matrix representation 212. The colored dot machine learned model 217 generates colored dot behavior identification data 219 based on the colored dot representation 214. As discussed in greater detail with reference to FIG. 8 below, each of the matrix behavior identification data 218 and colored dot behavior identification data 219 may comprise a set of predictions for the likelihood that the human body detected in the sequence of frames 202 is engaging in each type of human behaviour of a set of human behaviors. Each type of human behaviour is a different type human behaviour and the set of predictions includes a probability value associated with a given type of human behaviour in the set of human behaviours. Each type of human behaviour is otherwise referred to as a category or class of human behaviour. The matrix machine learned model 216 predicts a probability value for each type of human behaviour in the set of human behaviours and outputs a set of predictions that includes the predicted probability value for each type of human behaviour in the set of human behaviours. Similarly, colored dot matrix machine learned model 217 predicts a probability value for each type of human behaviour in the set of human behaviours and outputs a set of predictions that includes the predicted probability value for each type of human behaviour in the set of human behaviour.

In this hybrid system 200-1, a combiner 220 receives the matrix behavior identification data 218 and colored dot behavior identification data 219 and generates final behavior identification data 222 by combining matrix behavior identification data 218 and colored dot behavior identification data 219. The matrix behavior identification data 218 may comprise a different set of predictions than the colored dot behavior identification data 219. The matrix machine learned model 216 may be more or less accurate in predicting some types of human behaviors than the colored dot machine learned model 217. Thus, the combiner 220 may combine the matrix behavior identification data 218 and colored dot behavior identification data 219 using any of suitable mathematical or logical combination method known in the art. Examples of suitable mathematical or logical combination methods include weighting different probability values in the sets of predictions generated by each of the matrix and colored dot machine learned models 216, 217 differently, summing probability values in each of the sets of predictions, multiplying probability values in each of the sets of predictions, and so on. By combining the matrix behavior identification data 218 and colored dot behavior identification data 219 generated by each of the matrix and colored dot behaviour identification machine learning models 216, 217, the hybrid system 200 may be able to leverage the strengths of each different encoded representation type while compensating for the weakness of each. The human behaviour classifier 211 then processes the final behavior identification data 222 to generate a label indicative of the human behaviour and outputs the label.

FIGS. 2B and 2C present simplified versions of the hybrid system 200 of FIG. 2A. In FIG. 2B, a matrix system 250 relies entirely on the matrix representations 212 and matrix machine learned model 216 to generate matrix behavior identification data 218 indicative of a predicted human behaviour for the human detected in the sequence of frames 201. In FIG. 2C, a colored dot system 260 relies entirely on the colored dot representations 214 and colored dot machine learned model 217 to generate colored dot behavior identification data 219.

In some embodiments, as noted above, identifying key points at block 54 be performed by a key point identification convolutional neural network, such as a 2D CNN. Also as noted above, identifying human behavior at block 60 may be performed by a 3D CNN. Thus, in some embodiments, the key points identifier 206 may include a 2D CNN similar to the key point identification convolutional neural network described above. Further, in some embodiments, a 3D CNN may be used to learn each of the matrix machine learned model 216 and colored dot machine learned model 217 may be implemented using a 3D CNN, with each 3D CNN configured with different learned parameters.

The body detector 202, the body tracker 204, and the body part detector 208 may include separate CNNs with 2D convolution layers in some embodiments. In other embodiments, the body detector 202 and body part detector 208 are implemented using a 2D CNN, such as FasterRCNN—with Resnet50 or another pre-existing CNN structure adapted to object detection. In such embodiments, the body tracker 204 may rely entirely on the key point position sets 207, or the body tracker 204 may use its own separate 2D CNN to read a feature map of bounding box generated within the frame and use that feature map an identifier that is used to identify the human body and keep tracking it as the same human body across frames in the sequence of frames 201. This may provide more reliable body tracking and key point detection for frames that include multiple human bodies. However, it will be appreciated that each of the body detector 202 and the body tracker 204 may be implemented using other known techniques to carry out each function. Furthermore, one or more of the body detector 202, body tracker 204, and body part detector 208 may be omitted in some embodiments, which may directly extract key point position sets 207 from a frame using the key point identifier 206.

Figure 3:
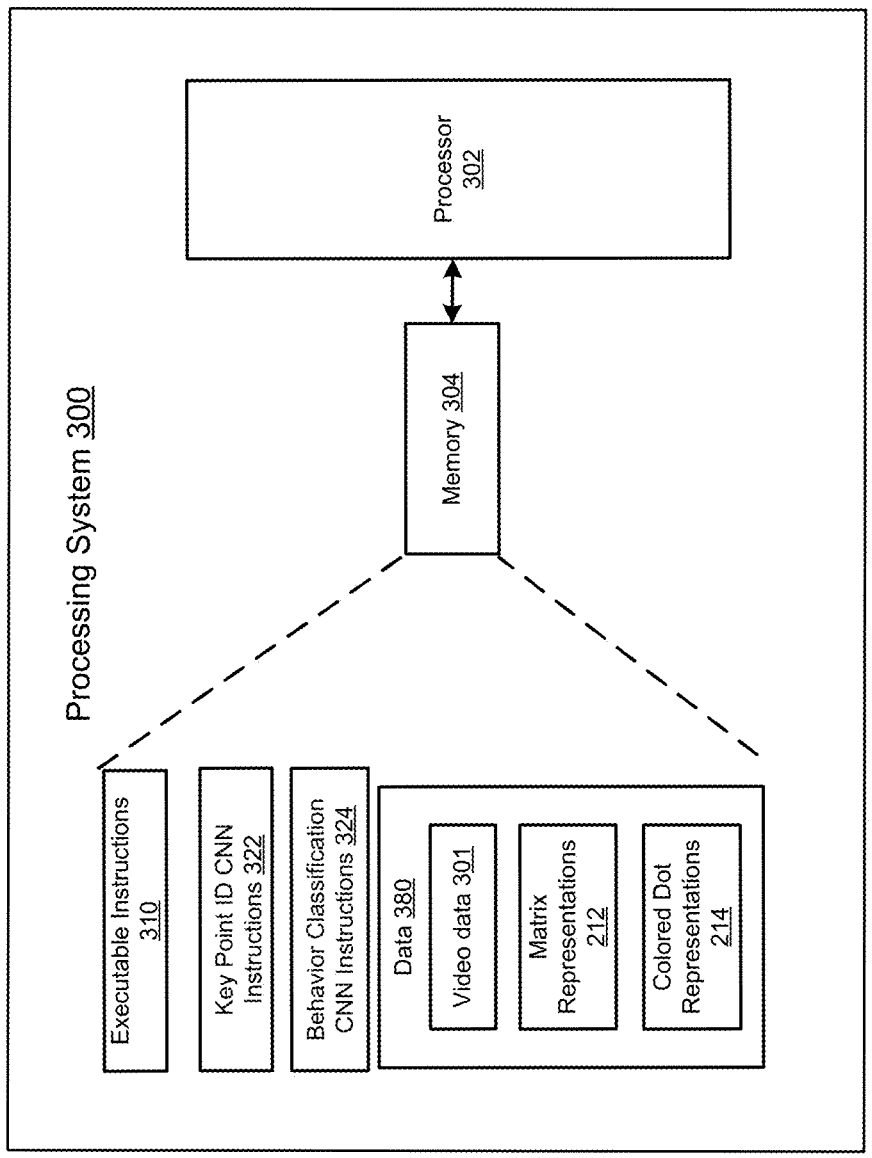
FIG. 3 is a block diagram of an example processing system for performing the first, second, and third methods for identifying human behavior in a sequence of frames of a digital video according to example embodiments described herein.

Any of the three systems 200, 250, 260 may be embodied as a processing system 300 as shown in FIG. 3. The processing system 300 includes a processor 302 for executing computer program instructions, and a memory 304 for storing executable instructions and data.

The processor 302 may be embodied as any processing resource capable of executing computer program instructions, such as one or more processors on a computer or computing platform(s). The memory 304 may be embodied as any data storage resource, such as one or more disk drives, random access memory, or volatile or non-volatile memory on one or more computing platforms.

The memory 304 has stored thereon several types of computer programs in the form of executable instructions. It has thereon a set of executable instructions 310 of the systems 200, 250, 260 for carrying out the methods described herein. It also has stored thereon one or more sets of instructions of trained neural networks or other machine learned models to identify key points in frames and/or to identify human behavior based on encoded representations, shown here as key point identification convolutional neural network instructions 322 and behavior classification convolutional neural network instructions 324.

The memory 304 may have stored thereon several types of data 380. The data 380 may include video data 301 representative of each frame (e.g. digital image) of the sequence of frames 201. In some embodiments, the video data 301 may be received from an external source via a communication system (not shown), potentially being stored in part in a buffer or cache in the memory 304. The memory 304 may also have stored thereon one or more types of key point position data representative of the key point position sets 207 and encoded representations of the key point position sets 207. In the illustrated embodiment, both matrix representations 212 and colored dot representations 214 are shown stored in the memory 304, consistent with the hybrid system 200 of FIG. 2A. The matrix representations 212 and colored dot representations 214 may be stored temporarily in a cache or queue in the memory 304 before being used as inputs to the matrix machine learned model 216 and the colored dot machine learned model 217.

As described above, the key point identifier 206 may include a CNN, such as a 2D CNN, hereinafter referred to as a key point identification convolutional neural network or key point identification CNN. Before being used by the system 200, the key point identification CNN is trained using supervised learning, with a training dataset comprising labelled frames. Example training datasets and loss functions used in supervised learning with a neural network for pose estimation are described in the references cited above.

Also as described above, the human behavior classifier 211 including the matrix machine learned model 216 or colored dot machine learned model 217 may be implemented as a CNN, such as a 3D CNN, hereinafter referred to as a behavior classification convolutional neural network or behavior classification CNN. Before being used by the behavior classification system (e.g. system 200), the behavior classification CNN is trained using supervised learning, with a data set comprising labeled data samples, where each data sample includes a frame with a human body and an encoded representation (e.g. matrix representations 212 or colored dot representations 214) for the human. Some embodiments may use a training dataset such as ICVL for Human Action Recognition (https://labicvl.github.io/Datasets_Code.html), which is pre-encoded by the body encoder 210 before being used as training data for the behavior classification CNN. The loss function used for training the behavior classification CNN may be categorical cross-entropy loss in some embodiments.

In the embodiments described herein, each of key points of a human body detected in a frame are assigned a unique identifier in the form of an index number, such as #1 through #17.

FIG. 4A shows an example frame 510 that includes a bounding box 516 generated for a human body 512 detected in the frame 510 and the key points identified for the human body overlaid on the image of the human body in frame. The frame 510 shows the human body 512 against a background 514. Key points identified in the frame 510 by the key point identifier 206 are shown as dots, such as a right hip key point 524, a left elbow key point 522, and a left wrist key point 520. In the frame 510 shown in FIG. 4A, the bounding box 516 is shown as a rectangular box overlaid on the frame 510 that encompasses the torso of the human body 512 i.e. the shoulder key points, sternum key point, and hip key points.

The frame 510 also includes a label overlaid on the human body 512. The label is the label of the identified human behaviour output by the human behavior classifier 211 and includes the words "walk close" 514. The label is associated with the human behavior that is the most likely human behavior from among the set of different types of human behaviours exhibited by the human body 512 detected in the frame 510 by the hybrid system 200. The identified human behavior is consistent with the fact that the human body 512 appears to be walking toward the camera. However, the label indicative of the identified human behavior "walk close" 514 may be generated by the human behaviour classifier 211 a sequence of frames encompassing a time period. The human behaviour classifier 211 may use the encoded representation generated for each frame in the sequence of frames 201 (which consists of a predetermined number of consecutive frames) to identify the human behavior during the time period encompassing the predetermined number of frames. Thus, the identified human behavior "walk close" 514 indicates that the "walk close" human behavior was identified as the most likely human behavior of the human body 512 from among a set of human behaviors during the time period encompassing the sequence of frames that includes the frame 510.

Figure 4B:
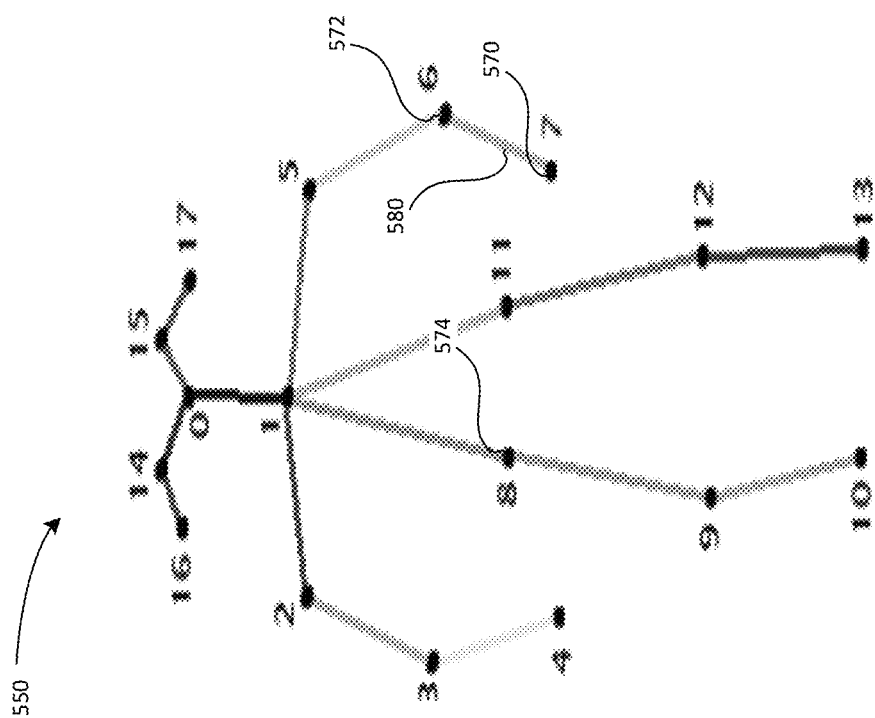
FIG. 4B is a visual representation of a plurality of key point coordinates as identified in the example frame shown in FIG. 4A by example embodiments described herein.
Figure 4A:
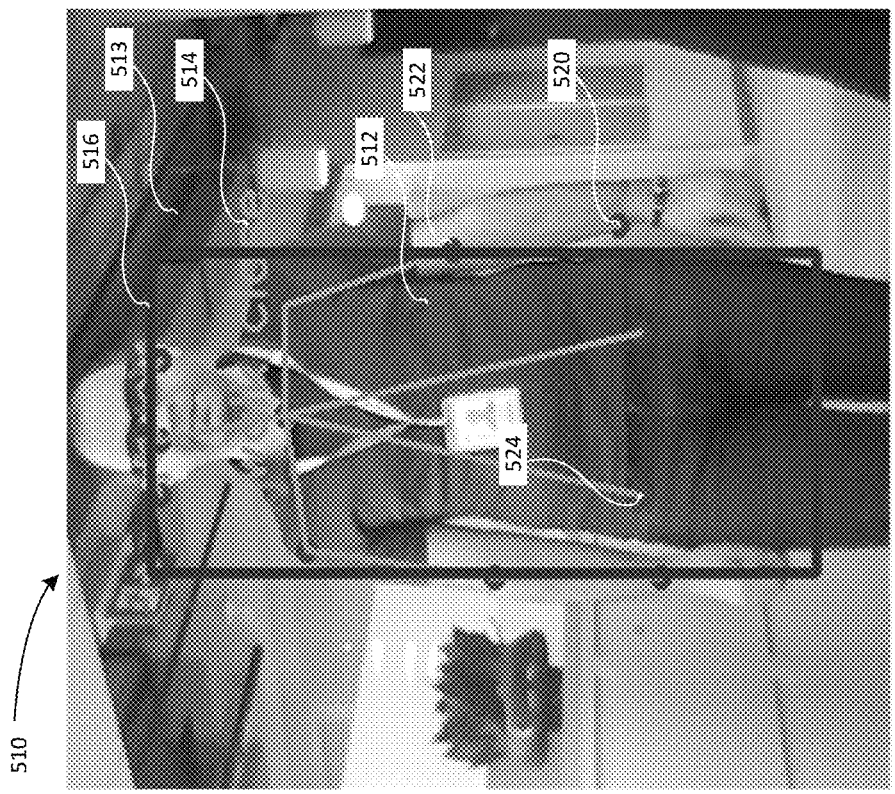
FIG. 4A is an example of a frame of sequence of frames of a digital video showing key points superimposed on an image of a human body in the frame by example embodiments described herein.

FIG. 4B shows an example key point skeleton 550 with identified key points corresponding to positions on a human body. As described above, each key point on the skeleton 550 is assigned a unique identifier in the form of an index number, from #1 to #17. Most of the key points (e.g. key points assigned index numbers #0 through #13) correspond to joints of the skeleton 550, while a few key points (key points assigned index numbers #0 and #14 through #17) correspond to fixed locations on the head, such as eyes, nose, and ears. For example, index number #8 corresponds to the right hip, and is shown in FIG. 4A as right hip key point 524 and right hip key point 574 in FIG. 4B. Index number #7 corresponds to the left wrist, and is shown as left wrist key point 520 in FIG. 4A and left wrist key point 570 in FIG. 4B. Left wrist key point 570 in FIG. 4B is marked with an index number "7. Index number #6 corresponds to the left elbow, and is shown as left elbow key point 522 in FIG. 4A and left elbow key point 572 in FIG. 4B. Left elbow key point 572 is marked with the index number "6". Various body parts may be identified on the skeleton 550 as the segments extending between two adjacent joints, such as left lower arm 580 between the left shoulder (left wrist key point 570 corresponding to index number #7) and the left elbow key point 572 corresponding to index number #6.

The key points shown in FIG. 4B are listed in the table below with their respective index numbers:

| Index Number | Body Location |
| --- | --- |
| #0 | Nose |
| #1 | Neck |
| #2 | Right Shoulder |
| #3 | Right Elbow |
| #4 | Right Wrist |
| #5 | Left Shoulder |
| #6 | Left Elbow |
| #7 | Left Wrist |
| #8 | Right Hip |
| #9 | Right Knee |
| #10 | Right Ankle |
| #11 | Left Hip |
| #12 | Left Knee |
| #13 | Left Ankle |
| #14 | Right Eye |
| #15 | Left Eye |
| #16 | Right Ear |
| #17 | Left Ear |

A key point position includes (X,Y) or (X,Y,Z) pixel coordinates of a key point with respect to the coordinate system of a frame. Thus, assuming the lower left corner of the frame 510 has pixel coordinates (0,0), the key point 574 corresponding to index number #8 (shown as right hip key point 524 in FIG. 4A) might have pixel coordinates (100, 80), and the key point position for key point 572 corresponding to index number #6 (shown as left elbow key point 522 in FIG. 4), might have pixel coordinates (190,170). As the knees and ankles of the body 512 are not visible within the frame 510, the knee key points (corresponding to index numbers #9 and #12) and the ankle key points (corresponding to index numbers #10 and #13) are not identified by the key point identifier 206 and are not shown as dots overlaid within the frame 510.

Example encoded representations generated by the body encoder 210 will now be described with reference to FIGS. 5A-5C and 6B. The matrix representations 212 are illustrated in FIGS. 5A-5C, while the colored dot representations 214 is illustrated in FIG. 6B.

Figure 5A:
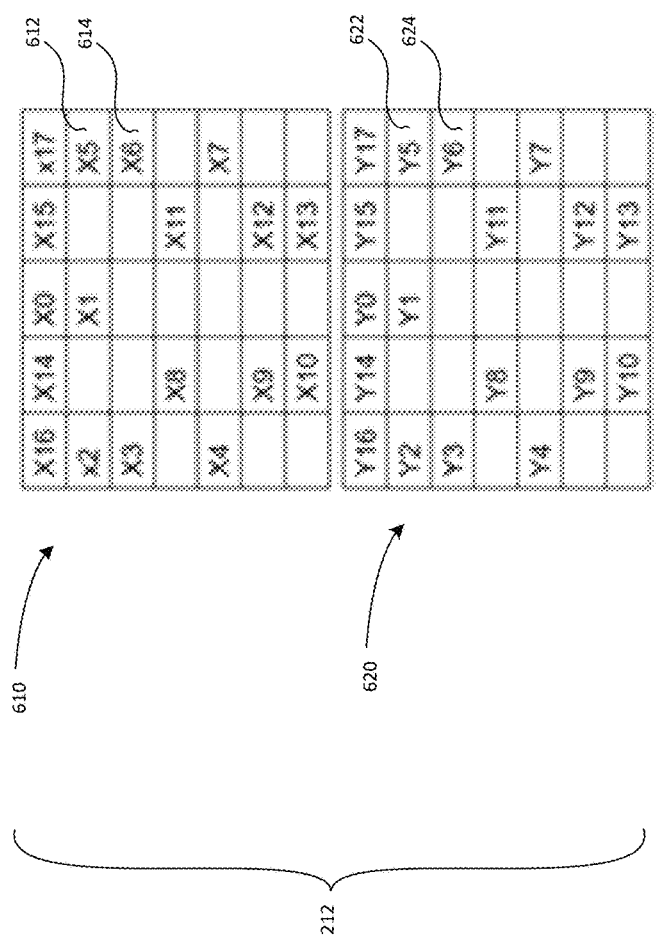
FIG. 5A is a first matrix representation of key point coordinate sets as X and Y coordinate matrices according to example embodiments described herein.
Figure 5B:
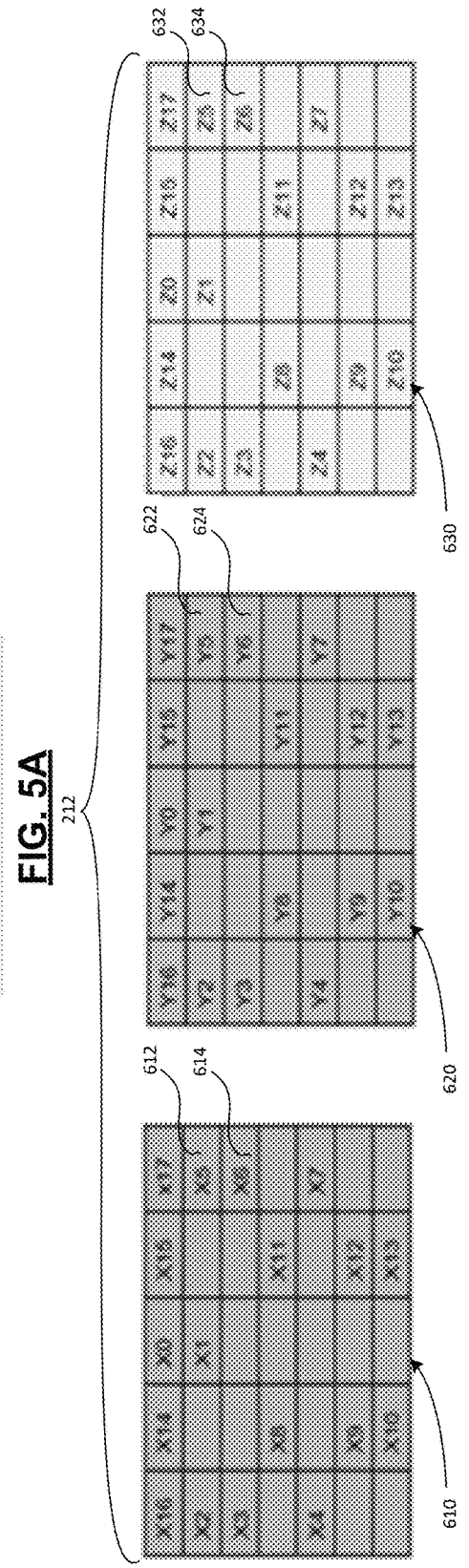
FIG. 5B is a second matrix representation of key point coordinate sets as X, Y, and Z coordinate matrices according to example embodiments described herein.
Figure 5C:
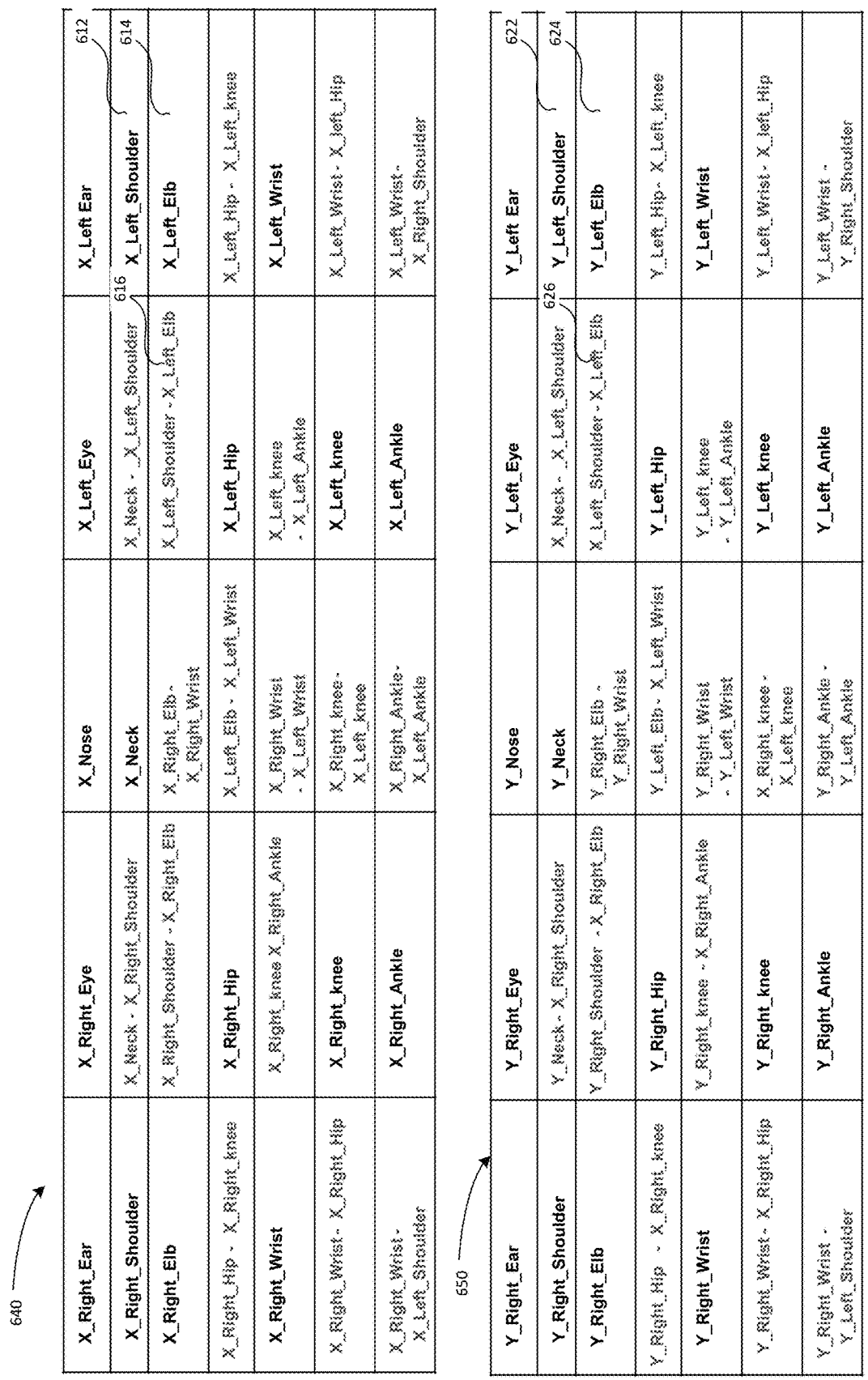
FIG. 5C is a third example representation of key point coordinate sets as X and Y coordinate matrices with blank matrix positions populated with key point relational data according to example embodiments described herein.

FIG. 5A shows a matrix representation 212 of the key point position set 207. The matrix representation 212 consists of a pair of two-dimensional matrices: an X matrix 610 and a Y matrix 620. The X matrix 610 encodes the horizontal (X) pixel coordinates of each key point position included in the key point coordinate set 207 for the frame identified within the bounding box generated for a human body by the key points identifier 206. The Y matrix 620 encodes the horizontal (X) pixel coordinates of each key point position included in the key point coordinate set 207 for the frame identified within the bounding box generated for a human body by the key points identifier 206. The pixel coordinate of each key point position is situated within its respective matrix 610, 620 in a position relative to the pixel coordinates of the other key points included in the key point coordinate set 207 based on a spatial relationship, such as a proximity relationship or a movement relationship, between the two corresponding body locations. For example, the X pixel coordinate for the key point 612 corresponding to index number #5 (left shoulder) is located adjacent to and above the X pixel coordinate for the key point 614 corresponding to index #6 (left elbow). The relative position of these two pixel coordinates is determined based on both the proximity of the left shoulder to the left elbow and also the close movement relationship the two joints have to each other on the human body. The movement of a body's left elbow in a sequence of frames will often bear a close relationship to the movement of the body's left shoulder in the sequence of frames, so locating the two pixel coordinates for the key points 612, 614 close together in the X matrix 610 assists the matrix calculations used by the matrix machine learned model 216. The same logic applies to the relative positions within the Y matrix 620 of the Y pixel coordinates, e.g. the Y pixel coordinate for key point 622 corresponding to index number #5 (left shoulder) and the Y pixel coordinate for the key point 624 corresponding to index number #6 (left elbow).

In embodiments that include a depth (Z) coordinate for the key points, the matrix representation 212 of a frame may further include a Z matrix 630. As described above, the Z coordinate included in each key point position may be generated by the key point identification CNN. The relative positions within the Z matrix 630 of the Z coordinates, e.g. the Z coordinate for key point 632 corresponding to index number #5 (left shoulder) and the Z coordinate for key point 634 corresponding to index number #6 (left elbow), follows the same logic as the X matrix 610 and Y matrix 620.

One potential challenge faced by the matrix machine learned model 216 is the sparse matrix operations required by the large number of unpopulated matrix positions in the X matrix 610, Y matrix 620, and Z matrix 630. In some embodiments, this challenge may be addressed by populating the empty matrix positions with additional pixel coordinates generated from the pixel coordinates of the key point positions for the key points and representing spatial relationships between two key points. FIG. 6C shows a matrix representation 212 consisting of a fully-populated X matrix 640 and a fully-populated Y matrix 650. Each fully-populated matrix 640, 650 has the same X or Y pixel coordinates in the same matrix positions as the X matrix 610 and Y matrix 620 respectively. However, each fully-populated matrix 640, 650 also populates the empty spaces from the matrices of FIG. 5A with pixel coordinates generated from a pair of pixel coordinates from nearby matrix positions. For example, the fully-populated X matrix 640 position second from the left and three down is populated with a pixel coordinates indicated by the variable name "X_Left_Shoulder-X_Left_Elb" 616, indicating a pixel coordinate generated from the Left Shoulder key point X pixel coordinate "X_Left_Shoulder" 612 and the Left Elbow key point X pixel coordinate "X_Left_Elb" 614. In some embodiments, the generated pixel coordinates may be calculated as a difference between the two pixel coordinates from which it is generated: e.g., the pixel coordinate of "X_Left_Shoulder-X_Left_Elb" 616 is equal to "X_Left_Shoulder" 612 minus "X_Left_Elb" 614. Similarly, the pixel coordinate of "Y_Left_Shoulder-Y_Left_Elb" 626 in fullypopulated Y matrix 650 is equal to "Y_Left_Shoulder" 622 minus "Y_Left_Elb" 624. Similar logic could be used to populate a fully-populated Z matrix (not shown).

The generated pixel coordinates, such as "X_Left_Shoulder-X_Left_Elb" 616, may thus represent distances between two key points in each of the (X,Y) or (X,Y,Z) coordinates. These distance values may be highly salient in recognizing behavior: for example, the distance from a left shoulder to a left knee is much shorter when sitting then when standing or walking. By populating the matrices with generated pixel coordinates that are highly salient to behavior recognition, and positioning these generated pixel coordinates in the matrices near related key points, the matrix machine learned model 216 may be assisted in generating a set of predictions.

Figure 6A:
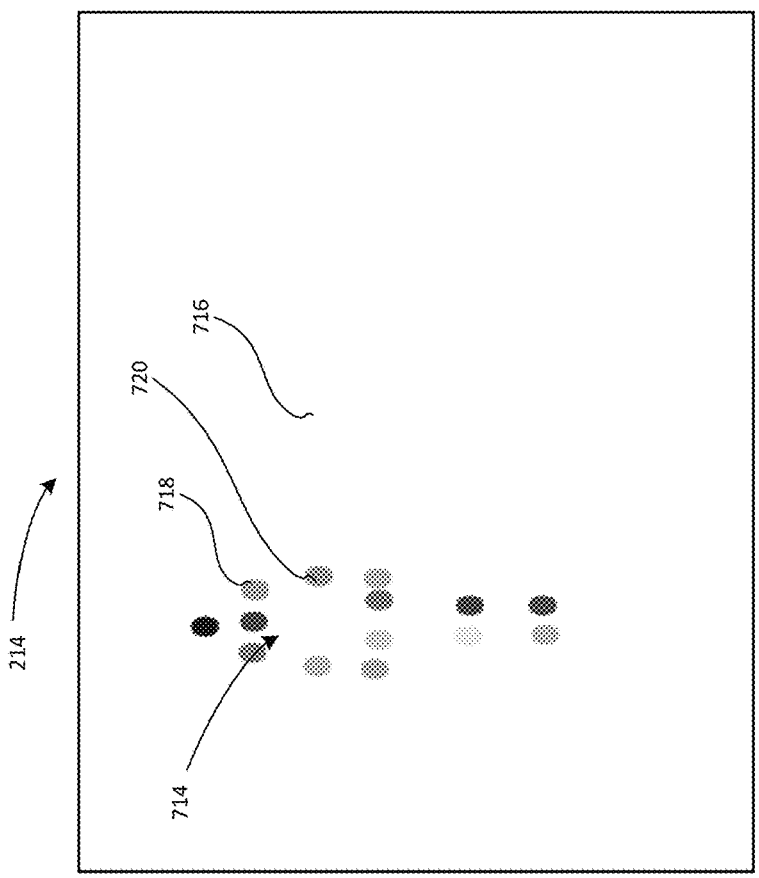
FIG. 6A is a second example of a frame of a digital video showing an image of a human body on a background.
Figure 6B:
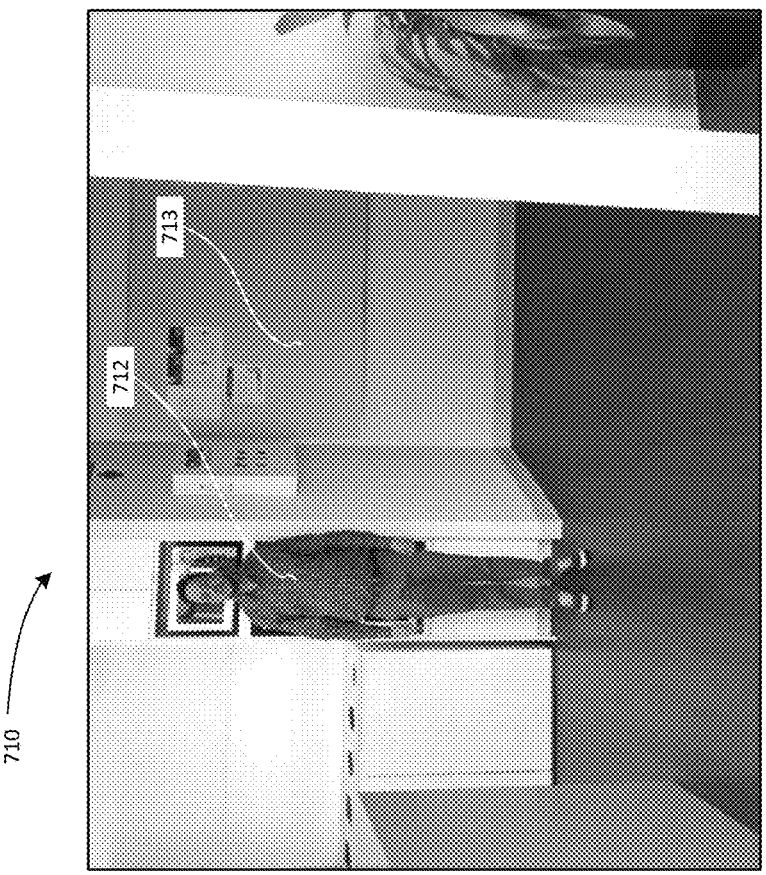
FIG. 6B is an example colored dot representation of a plurality of key point coordinate sets as identified in the second example frame shown in FIG. 6A by example embodiments described herein.
Figure 7:
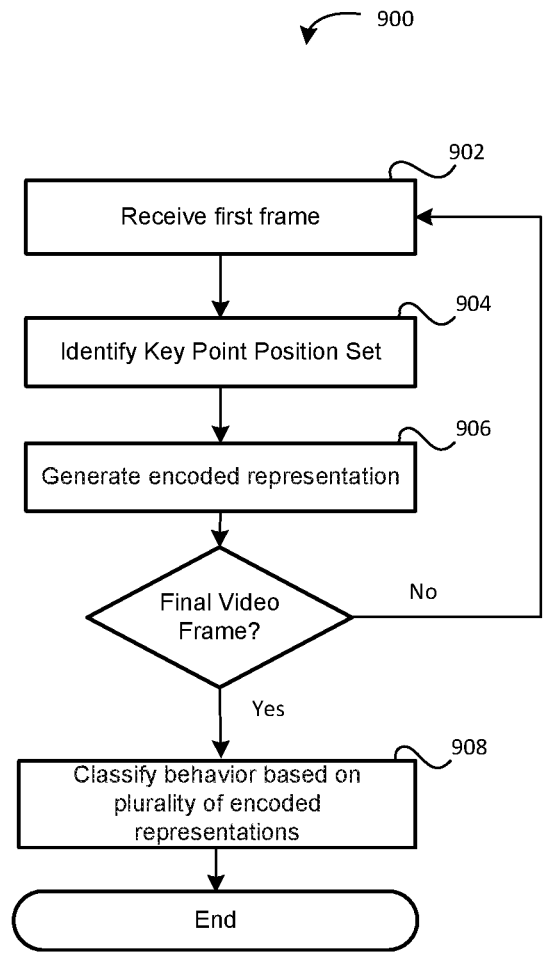
FIG. 7 is a detailed flowchart of an example method for identifying human behavior in a digital video according to example embodiments described herein.

Referring to FIG. 6A, a second example of a frame 710 of a digital video showing an image of a human body 712 on a background 713 is shown. In FIG. 6A, the human body 712 is visible standing against the background 713. Referring to FIG. 6B, an example colored dot representation 214 generated for the frame 710 shown in FIG. 6A is shown. The colored dot representation 214 is a simplified frame (e.g., digital image) that includes a plurality of unique visual representations for each key point identified within the bounding box generated by the body tracker 204. In FIG. 6B, the colored dot representation 214 consists of a monochromatic (e.g. blank or white) background 716 on which are superimposed colored two-dimensional shapes 714, shown here as round dots, in (X,Y) positions corresponding to each key point position from the frame 710. Each round dot corresponds to a key point, such as left shoulder round dot 718 and left elbow round dot 720 corresponding to the positions of the left shoulder and left elbow, respectively, of the human body 712 of FIG. 6A included in the key point position set 207 for the frame 710. Each colored dot has a unique color, represented by a unique RGB value, other color space value, or brightness value, relative to the other colored dots.

As described above, the body encoder 210 generates the colored dot representation 214 by eliminating all redundant visual information including background information 716 and other non-key-point visual information about the body 712 in the frame 710. Thus, the colored dot representation 214 is as a simplified frame (e.g., digital image) that has all redundant visual information including background information 716 and other non-key-point visual information about the body 712 in the frame 710 removed. The colored dot representation 214 can be down-sampled and processed at a low resolution without losing the salient information, which reduces the computations performed by the human behavior classifier 211 when processing the colored dot representations 214 to identify a human behaviour.

A flowchart of a method 900 for identifying human behavior in a sequence of frames is shown in FIG. 9. The method 900 begins a receiving a first frame of a sequence of frames at step 902. Each frame in the sequence of frames is a digital image. At step 904, the first frame is processed to identify a plurality of key point coordinate sets in the frame. In some embodiments, a plurality of key point position sets are identified in the frame by the key point identifier 206 described above. At step 906, an encoded representation is generated from the key point position set 207. In some embodiments, an encoded representation is generated from each key point position set based on the plurality of key point positons included in the key point position set as described above. In some embodiments, the encoded representation is a matrix representation 212. In some embodiments, the encoded representation is a colored dot representation 214.

Steps 902 through 906 repeat until the last frame of the sequence of frames 201 has been processed. As described above, in some embodiments, the encoded representation are queued when time steps 902 through 906 are repeated.

At step 908, a human behavior classifier is used to identify a behavior of the human body based on the plurality of encoded representations corresponding to the plurality of frames and output a label indicative of the identified human behaviour. In the case of a matrix system 250, the behavior classifier includes the matrix machine learned model 216. In the case of a colored dot system 260, the human behavior classifier includes the colored dot machine learned model 217.

It will be appreciated that the methods and systems described herein may be applied, in some embodiments, to identification of the behavior of objects other than humans, given appropriate training of the neural networks used to identify key points and the neural networks used to identify behavior of the object. In a further example embodiment, animal behavior could be identified by training the key point identifier with a label training data frames that include animal bodies with labelled key points, and by training the human behavior classifier using labeled pose or key point data (pre-encoded by the body encoder 210) with labels identifying various behaviors of the animals; in such an embodiment, the key points could correspond to animal body joints as with the human body examples described above. In other embodiments, key points could be mapped to moving parts of any system shown in frames: for example, vehicles or parts of vehicles.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method, carried out by a processor executing computer program instructions, comprising:
receiving at least one key point position set for a frame of a sequence of frames, the at least one key point position set including a key point position for each key point of a human body detected in the frame, each key point position corresponding to a location of a joint of the human body;
generating an encoded representation for each key point position set of the at least one key point position set for the frame, each encoded representation comprising:
an X matrix having a plurality of X pixel coordinates for the plurality of key point positions in the key point position set, a first X pixel coordinate and second X pixel coordinate being positioned within the matrix relative to each other based on a proximity relationship or movement relationship between a first joint of the human body and a second joint of the human body corresponding to the first X pixel coordinate and second X pixel coordinate respectively; and
a Y matrix having a plurality of Y pixel coordinates for the plurality of key point positions in the key point position set, a first Y pixel coordinate and second Y pixel coordinate being positioned within the matrix relative to each other based on a proximity relationship or movement relationship between a first joint of the human body and a second joint of the human body corresponding to the first Y pixel coordinate and second Y pixel coordinate respectively; and
providing the encoded representation for each of the at least one key point position set for the frame to a human behaviour classifier that includes a machine learned model that is configured to identify a behaviour of the human body based on the encoded representation for each key point position set and output the identified behavior of the human body.

2. The method of claim 1, further comprising:
receiving a plurality of key point position sets, each key point position set correspond to one frame in the sequence of frames; and
generating an encoded representation for each key point position set of the plurality of key point position sets; and
providing the encoded representation to the human behaviour classifier that includes the machine learned model that is configured to identity a human behaviour based on the plurality of encoded representations and output the identified behavior of the human body.

3. The method of claim 2, further comprising:
receiving the sequence of frames; and
processing each respective frame in the sequence of frames to generate the key point position set corresponding to the respective frame.

4. The method of claim 3, wherein the key point position set is generated using a key points identifier configured to receive a bounding box for the human body comprising one or more pixel values of a plurality of pixels of the respective frame, process the bounding box to identify key points within the bounding box and generate a key point position for each key point, and generate the key point position set that includes the key point position for each key point identified in the frame.

5. The method of claim 1, wherein each encoded representation further comprises:
a Z matrix having a plurality of Z depth coordinates for the plurality of key point positions in the key point position set, a first Z depth coordinate and second Z coordinate being positioned within the matrix relative to each other based on a proximity relationship or movement relationship between a first joint of the human body and a second joint of the human body corresponding to the first Z coordinate and second Z coordinate respectively.

6. A processing system, comprising:
a processor; and
a memory having stored thereon executable instructions that, when executed by the processor, cause the device to:
receive at least one key point position set for a frame of a sequence of frame, the at least one key point position set including a key point position for each key point of a human body detected in the frame, each key point position corresponding to a location of the key point on the human body;
generate an encoded representation for each key point position set of the at least one key point position set for the frame, each encoded representation comprising:
an X matrix having a plurality of X pixel coordinates for the plurality of key point positions in the key point position set, a first X pixel coordinate and second X pixel coordinate being positioned within the matrix relative to each other based on a proximity relationship or movement relationship between a first joint of the human body and a second joint of the human body corresponding to the first X pixel coordinate and second X pixel coordinate respectively; and
a Y matrix having a plurality of Y pixel coordinates for the plurality of key point positions in the key point position set, a first Y pixel coordinate and second Y pixel coordinate being positioned within the matrix relative to each other based on a proximity relationship or movement relationship between a first joint of the human body and a second joint of the human body corresponding to the first Y pixel coordinate and second Y pixel coordinate respectively; and
provide the encoded representation for each of the at least one key point position set for the frame to a human behaviour classifier that includes a machine learned model that is configured to identify a behaviour of the human body based on the encoded representation for each key point position set and output the identified behavior of the human body.

7. The processing system of claim 6, wherein the executable instructions, when executed by the processor, further cause the device to:
receive a plurality of key point position sets, each key point position set correspond to one frame in the sequence of frames; and
generate an encoded representation for each key point position set of the plurality of key point position sets; and
provide the encoded representation to the human behaviour classifier that includes the machine learned model that is configured to identity a human behaviour based on the plurality of encoded representations and output the identified behavior of the human body.

8. The processing system of claim 7, wherein the executable instructions, when executed by the processor, further cause the device to:
receive the sequence of frames; and
for each frame of the sequence of frames, generate the key point position set corresponding to the frame.

9. The processing system of claim 6, wherein the encoded representation is a matrix representation and wherein the machine learned model is a matrix machine learned model, and wherein each key point position corresponds to a joint of the human body.

10. The processing system of claim 6, wherein each encoded representation further comprises:
a Z matrix having a plurality of Z depth coordinates for the plurality of key point positions in the key point position set, a first Z depth coordinate and second Z coordinate being positioned within the matrix relative to each other based on a proximity relationship or movement relationship between a first joint of the human body and a second joint of the human body corresponding to the first Z coordinate and second Z coordinate respectively.

11. A non-transitory processor-readable medium containing instructions which, when executed by a processor of a processing system cause the processing system to:
receive at least one key point position set for a frame of a sequence of frame, the at least one key point position set including a key point position for each key point of a human body detected in the frame, each key point position corresponding to a location of the key point on the human body;
generate an encoded representation for each key point position set of the at least one key point position set for the frame, each encoded representation comprising:
an X matrix having a plurality of X pixel coordinates for the plurality of key point positions in the key point position set, a first X pixel coordinate and second X pixel coordinate being positioned within the matrix relative to each other based on a proximity relationship or movement relationship between a first joint of the human body and a second joint of the human body corresponding to the first X pixel coordinate and second X pixel coordinate respectively; and
a Y matrix having a plurality of Y pixel coordinates for the plurality of key point positions in the key point position set, a first Y pixel coordinate and second Y pixel coordinate being positioned within the matrix relative to each other based on a proximity relationship or movement relationship between a first joint of the human body and a second joint of the human body corresponding to the first Y pixel coordinate and second Y pixel coordinate respectively; and
provide the encoded representation for each of the at least one key point position set for the frame to a human behaviour classifier that includes a machine learned model that is configured to identify a behaviour of the human body based on the encoded representation for each key point position set and output the identified behavior of the human body.

12. The medium of claim 11, wherein the executable instructions, when executed by the processor, further cause the cause the processing system to:
receive a plurality of key point position sets, each key point position set correspond to one frame in the sequence of frames; and
generate an encoded representation for each key point position set of the plurality of key point position sets; and
provide the encoded representation to the human behaviour classifier that includes the machine learned model that is configured to identity a human behaviour based on the plurality of encoded representations and output the identified behavior of the human body.

13. The medium of claim 12, wherein the executable instructions, when executed by the processor, further cause the cause the processing system to:
receive the sequence of frames; and
process each respective frame in the sequence of frames to generate the key point position set corresponding to the respective frame.

14. The medium of claim 13, wherein the key point position set is generated using a key points identifier configured to receive a bounding box for the human body comprising one or more pixel values of a plurality of pixels of the respective frame, process the bounding box to identify key points within the bounding box and generate a key point position for each key point, and generate the key point position set that includes the key point position for each key point identified in the frame.

15. The medium of claim 11, wherein each encoded representation further comprises:
a Z matrix having a plurality of Z depth coordinates for the plurality of key point positions in the key point position set, a first Z depth coordinate and second Z coordinate being positioned within the matrix relative to each other based on a proximity relationship or movement relationship between a first joint of the human body and a second joint of the human body corresponding to the first Z coordinate and second Z coordinate respectively.

* * * * *